US006750164B2

(12) United States Patent
Larkin

(10) Patent No.: US 6,750,164 B2
(45) Date of Patent: Jun. 15, 2004

(54) IONIZING WIPER

(76) Inventor: William J. Larkin, 27 Parsons Dr., Swampscott, MA (US) 01907

( * ) Notice: Subject to any disclaimer, the term of this patent is extended or adjusted under 35 U.S.C. 154(b) by 35 days.

(21) Appl. No.: 09/855,924

(22) Filed: May 15, 2001

(65) Prior Publication Data

US 2001/0041488 A1 Nov. 15, 2001

Related U.S. Application Data

(60) Provisional application No. 60/204,268, filed on May 15, 2000.

(51) Int. Cl.[7] ......................... D03D 15/00; B32B 15/14; D04H 1/00; D04H 13/00; D04H 3/00; D04H 5/00

(52) U.S. Cl. ....................... 442/228; 442/229; 442/376; 442/377; 442/414; 428/922

(58) Field of Search .......................... 428/922; 442/228, 442/229, 376, 377, 414, 110, 111, 301, 304

(56) References Cited

U.S. PATENT DOCUMENTS

| | | | | |
|---|---|---|---|---|
| 3,678,675 A | * | 7/1972 | Klein | 428/96 |
| 3,882,667 A | * | 5/1975 | Barry | 57/362 |
| 4,422,483 A | * | 12/1983 | Zins | 428/368 |
| 4,756,941 A | * | 7/1988 | McCullough et al. | 428/95 |
| 5,213,865 A | * | 5/1993 | Yamada | 428/92 |
| 5,501,899 A | * | 3/1996 | Larkin | 442/110 |
| 5,525,411 A | * | 6/1996 | Stewart et al. | 442/56 |
| 5,690,014 A | * | 11/1997 | Larkin | 87/13 |
| 5,740,006 A | * | 4/1998 | Larkin | 361/213 |
| 5,935,882 A | * | 8/1999 | Fujita et al. | 442/247 |
| 6,522,077 B2 | * | 2/2003 | Larkin | 315/111.91 |

* cited by examiner

*Primary Examiner*—Elizabeth M. Cole
*Assistant Examiner*—Jeremy R. Pierce
(74) *Attorney, Agent, or Firm*—Perkins Smith & Cohen LLP; Peter J. Borghetti

(57) ABSTRACT

An ionizing wiper for removing static charge from an insulative surface. The wiper is made of wiping material with a high density of ionizing points being disposed along the surface of the wiper such that the air between the ionizing points and an object is sufficiently ionized to remove static charge from the object.

19 Claims, 9 Drawing Sheets

1/9

IONIZING WIPER

CROSS REFERENCE TO RELATED APPLICATIONS

This application claims priority of Provisional Application No. 60/204,268, entitled IONIZING ANTISTATIC WIPER filed on May 15, 2000, and which is incorporated herein by reference.

BACKGROUND OF THE INVENTION

The present invention relates to static control devices, and particularly relates to wiping cloths providing control of static charge buildup.

Wiping of plastic, glass, and other substantially insulative surfaces to remove particles of dust and dirt may result in a buildup of static charge on the surface of the material, which re-attracts the particles to the surface. Re-attraction of dust and dirt particles to surfaces such as photographic film, computer monitor screens, acrylics, and other common polymeric materials can result in such problems as scratching of the surface from repeated wiping of computer screens, visual defects in picture framing, or dust spots on photo enlargements.

Conventional antistatic wipers use conductive yarn or treatments to change their surface resistivity. However, the resistivity of the wiper is not related directly to the reduction of static charge on an insulative surface because by definition, an insulator cannot be grounded. Many surfaces such as polymeric materials and glass are good insulators and tend to accumulate electrons on their surfaces. A conductive material can transfer electrons readily to such a surface when it is wiped. A grounded conductive, static dissipative, or anti-static surface is not able to consistently remove static from an insulative surface. This concept is described more fully in U.S. Pat. Nos. 5,501,899, 5,690,014, and 5,740,006, all by the same inventor as the present application and incorporated herein by reference. This concept is important in the understanding of the present invention and the differences between the wiper described herein and conventional wipers.

Accordingly, it is an object of the present invention to provide an ionizing wiper that overcomes the disadvantages of the prior art.

It is another object of the invention to provide an ionizing wiper that combines the characteristics of a conventional wiper with at least one wiper portion that uses ionizing points at the surface of the wiper.

SUMMARY OF THE INVENTION

The present invention is an ionizing wiper for removing static charge from a substantially insulative surface comprising a cloth, being made of ordinary wiping material, and a plurality of ionizing points being disposed on said cloth defining an ionizing wipe area. The plurality of ionizing points being of sufficient density such that air between said plurality of ionizing points and an object is sufficiently ionized to remove static charge from the object.

For a better understanding of the present invention, together with other and further objects thereof, reference is made to the accompanying drawings and detailed description and its scope will be pointed out in the appended claims.

DETAILED DESCRIPTION OF THE PREFERRED EMBODIMENTS

In one exemplary embodiment, an ionizing wiper includes a cloth with two wiping surfaces that have different characteristics. One wiping surface of the cloth exhibits the characteristics of an ordinary wiping cloth for a particular application, e.g., a photonegative, a computer screen, or a polymeric material. The opposite surface of the cloth is an ionizing static control surface incorporating a multiplicity of ionizing points, preferably provided by one or more ionizing static control strands or ionizing static control cords (discussed in detail below). An surface, substantially insulative, may be wiped with the conventional side of the cloth, and then the cloth may be reversed to rewipe the surface with the ionizing static control surface for removal of the static charge built up during the conventional wiping.

Figure 1:
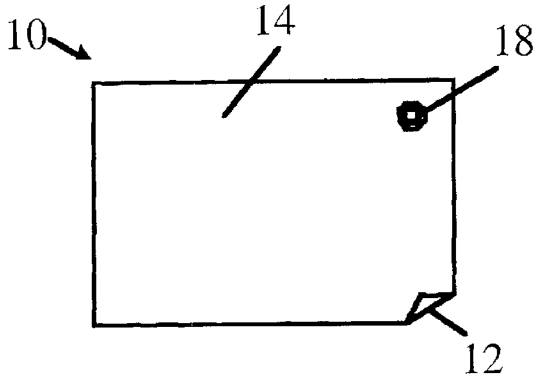
FIG. 1 is a pictorial view of an ionizing antistatic wiper in accordance with one embodiment of the present invention.
Figure 2:
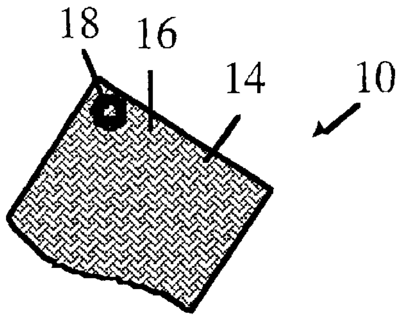
FIG. 2 is a top view of a portion of the wiper of FIG. 1, showing a pattern of ionizing strands exposed on one surface of the wiper.
Figure 3:
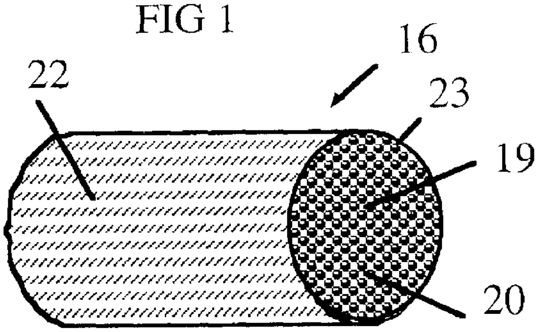
FIG 3 (PRIOR ART)
FIG. 3 illustrates a pictorial section of prior art ionizing strand including soft fibers twisted together with electrically conductive microfibers having a multiplicity of ionizing points provided by ends of and bends in each microfiber.
Figure 8:
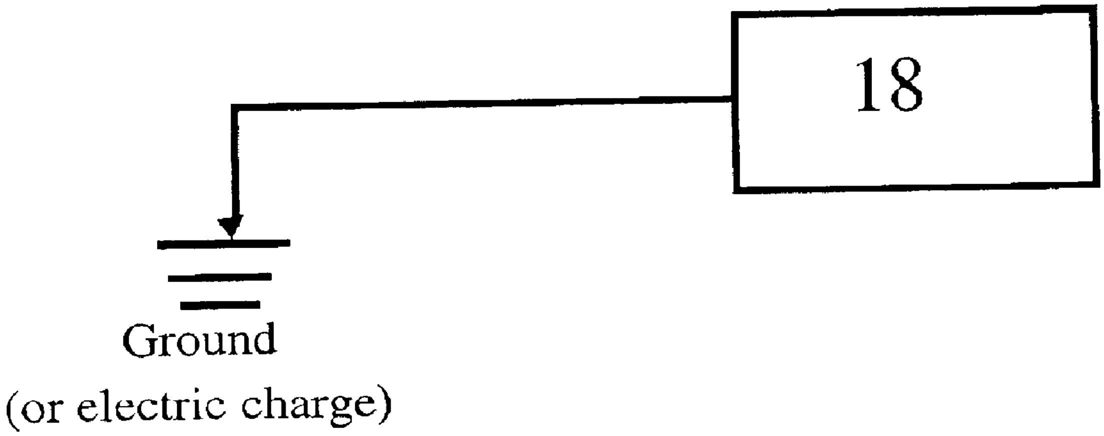
FIG. 8 is a schematic of the grounding/ionization neutralization circuit.

Referring now to FIGS. 1, 2, and 3, ionizing wiper 10 in accordance with one embodiment of the present invention includes conventional wiping surface 12 and opposite, ionizing wiping surface 14. Conventional wiping surface 12 may be e.g., woven of a soft yarn such as cotton, nylon, or other conventional wiping cloth material selected for a particular application. Ionizing wiping surface 14 includes ionizing static control strand 16, e.g., woven into the wiper material to be exposed only on the ionizing surface 14. Ionizing static control strands 16 are electrically interconnected with one another and with connector 18. Connector 18, in turn, may be electrically connected by conventional means to ground for static removal, or to a source of electrical power for static neutralization, as illustrated in FIG. 8.

A magnified cross-section of an ionizing static control strand 16, as described in U.S. Pat. No. 5,690,014, incorporated by reference herein, that is used in all wiper embodiments, is illustrated in FIG. 3. The ionizing static control strand 16 includes soft fibers 19 twisted together with a multiplicity of electrically conductive microfibers 20 in electrical communication with one another. The softer fibers 19 most preferably account for approximately ⅔ of the surface of each ionizing static control strand 16, and also provide a non-abrasive surface to prevent scratching of the wiped surfaces. The electrically conductive microfibers 20 provide a multiplicity of ionizing points 22 at the ends and at the bends of the electrically conductive microfibers 20. Therefore, a multiplicity of ionizing points 22 are disposed along the length of the ionizing static control strand 16 and exposed at or extending minimally above the outer surface 23 of the ionizing static control strand 16.

In a preferred embodiment, the ionizing surface 14 includes in its weave a pattern of the above-described ionizing static control strands 16 exposed at that surface. Where the ionizing static control strand 16 are to be effective over an entire surface of the wiper 10 (FIG. 2), the weave is selected to expose the ionizing static control strand 16 at only one wiping surface. In either embodiment, a significant portion of the ionizing wiper 10 provides a conventional, non-static removal surface for conventional wiping.

The electrically conductive microfibers 20 of each ionizing static control strand 16 in the above-described pattern are in electrical contact with one another to form a network of ionizing points 22. Thus, when this network is electrically grounded (or, alternatively electrically charged), air between the ionizing points and a surface adjacent to or contacting the ionizing surface or portion of the wiper is sufficiently ionized to remove static charge from the surface being wiped.

The electrically conductive microfibers 20 of the ionizing static control strand 16 typically are about 0.5 to 50 microns in diameter and about 2–8 cm long. The electrically conductive microfibers 20 of a diameter less than 40 microns are greatly preferred to prevent scratching of the surfaces on which they are used. Preferred conductive materials for the electrically conductive microfibers 20 include carbon, metal-coated carbon, copper, stainless steel, metal-coated acrylic, metallized acrylic, or electrically conductive polymers.

In the preferred embodiment, the ionizing static control strand 16 is adapted to be grounded or electrically charged (FIG. 8). One grounding method electrically connects the connector 18 to a wire or coiled wire or an extension of the ionizing cord (to be discussed below), to a conventional grounding means, e.g., by draping a length of wire or ionizing cord to contact a grounded surface. The connector 18 is in electrical communication with the network of ionizing points 22, thereby transferring the ionized particles to ground. Alternatively, an electric charge can be passed in the opposite direction to neutralize the static charge at the insulating surface.

In applications in which the charge is minimal, the grounding means may be the human operator, who may act as an ungrounded reservoir for the charge. Alternatively, the operator may be conventionally grounded, e.g., using a heel or wrist strap.

The description below of various illustrative embodiments shown in the Drawings refers to embodiments similar to those described above. However, it is not intended to limit the scope of the present invention, but merely to be illustrative and representative thereof.

Figure 4:
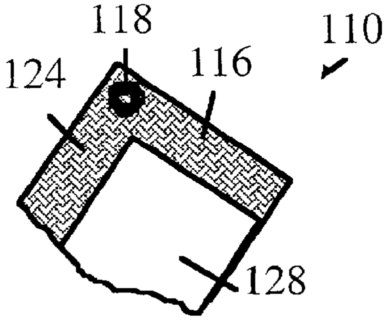
FIG. 4 is a top view of a portion of an ionizing wiper in accordance with another embodiment of the present invention, showing a pattern of ionizing strands at the periphery of one side of the wiper.

In an alternative embodiment the ionizing static control strand 116 is only disposed along the periphery, as illustrated in FIG. 4. The weave of ionizing static control strand 116 may be a conventional weave selected to expose the ionizing static control strand 116 at both wiping surfaces or only one wiping surface. FIG. 4 shows the ionizing static control strands 116 exposed only at the outer surface 124 of the wiper 110. The ionizing static control strand 116 may be exposed at one or more outer surfaces 124 of the wiper 110, and at one or both sides of the wiper 110. The wiper 110 includes ionizing static control strand 116 at the outer surface 124 of wiper 110, while central portion 128 includes no ionizing strands 116. Central portion 128 of wiper 110 may be, e.g., woven of the soft yarns as described above. Wiper 210 may be grounded or connected to a source of electrical power via connector 218, as described above.

Figure 5:
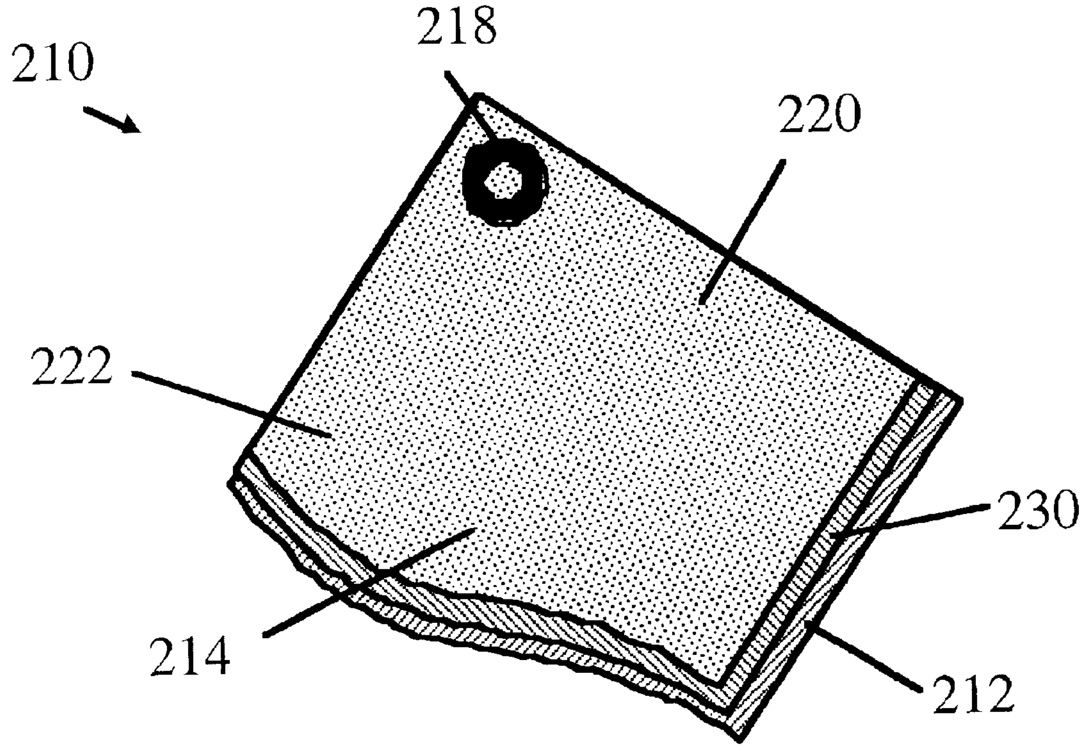
FIGS. 5, 6, 7*a*, 7*b*, 7*c*, 7*d*, and 7*e* are top views of portions of the ionizing wiper in accordance with alternate embodiments of the invention.

Alternatively, the electrically conductive microfibers 220 described above may be directly attached to a wiper surface or portion using an electrically conductive adhesive material, as illustrated in FIG. 5. In this embodiment, the wiper 210 may be fabricated from a woven or non-woven material. Wiper 210 includes wiper base 212 of a conventional wiper material. Layer 230 of a conductive adhesive bonds electrically conductive microfibers 220 to wiper base 212 in such a way that a multiplicity of ionizing points 222 is provided at only one wiping surface 214 of wiper 210. Wiper 210 may be grounded or connected to a source of electrical power via connector 218, as described above.

Figure 6:
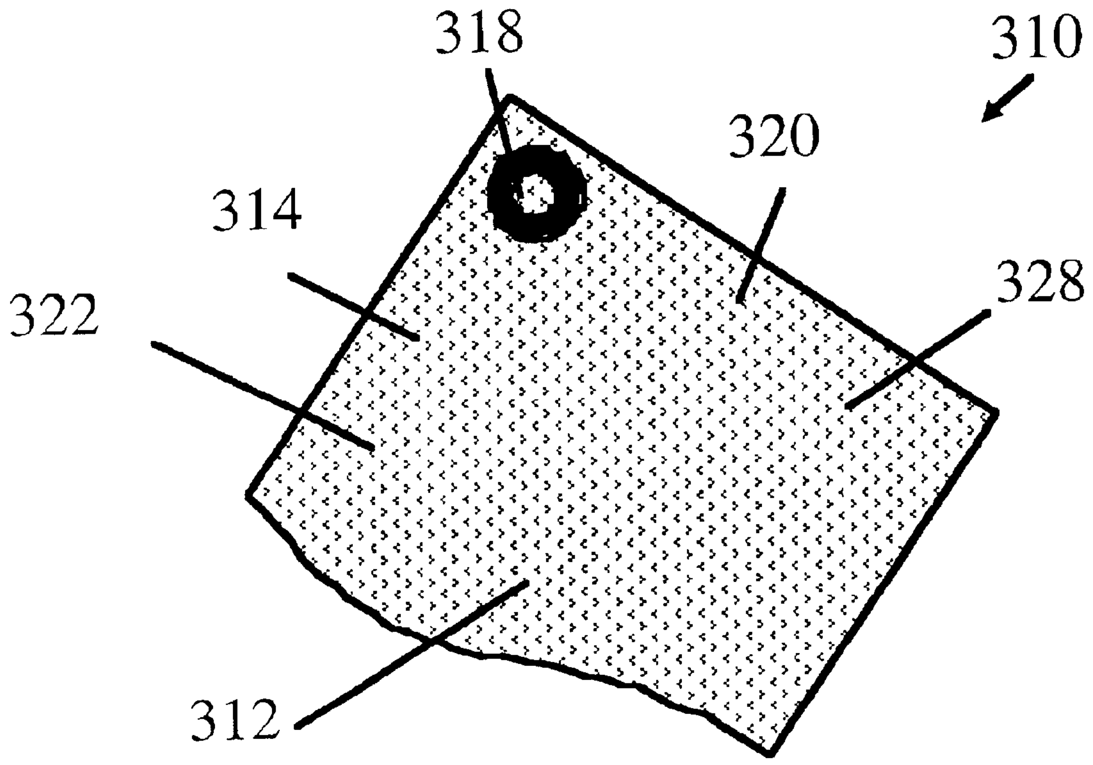

In yet another alternative embodiment 310 illustrated in FIG. 6, electrically conductive microfibers 320 are included in a felted, e.g., by known flocking methods, or equivalent material in such a way as to expose the multiplicity of ionizing points 322 at only one wiping surface of the wiper or only at all or part of the periphery of one or both wiping surfaces. Wiper 310 is fabricated from soft fibers 328 and electrically conductive microfibers 320 matted together to form non-woven fabric 312. The wiper 310 is fabricated in such a way that electrically conductive microfibers 320 are exposed at only one wiper surface 314, providing ionizing points 322 (as described above in FIG. 3) exposed at that one surface 314 of the wiper 310. Wiper 310 may be grounded or connected to a source of electrical power via connector 318, as described above.

Alternatively, a surface 412 of the wiper 410 includes a pattern of small diameter ionizing cords 426, each fabricated by braiding or twisting together a plurality of ionizing static control strand 16, at least one of which is an above-described electrically conductive microfibers 20. These ionizing cords 426 are described in U.S. Pat. No. 5,690,014 and herein incorporated by reference. A multiplicity of the ionizing points 22 (same as shown in FIG. 3) of the one or more ionizing static control strand 16 (same as shown in FIG. 3) of each ionizing cords 426 are disposed along the length of the ionizing cords 426 and are exposed at or extend minimally above the outer surface of the ionizing cords 426. FIGS. 7*a*, 7*b*, 7*c*, 7*d*, and 7*e* illustrate examples of wipers 410 with a varying array of patterns.

Figure 7A:
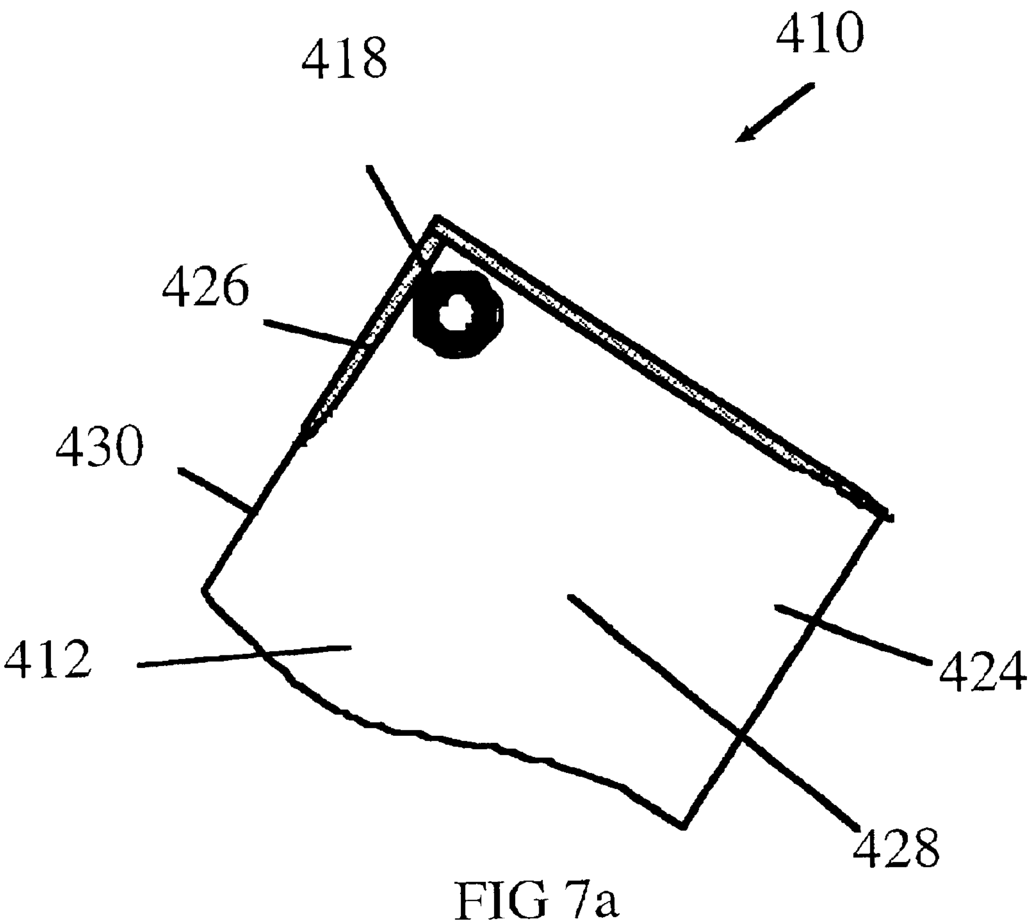
Figure 7B:
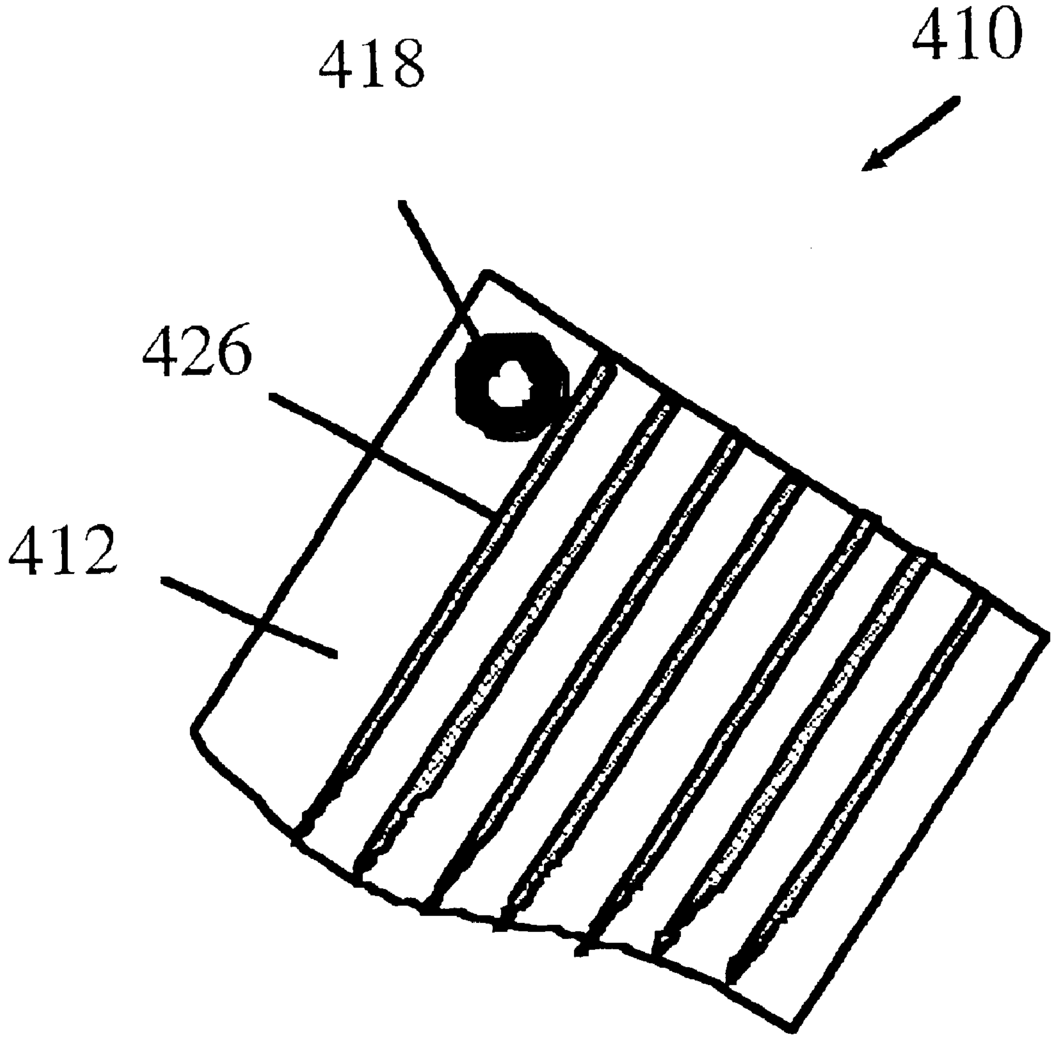
Figure 7C:
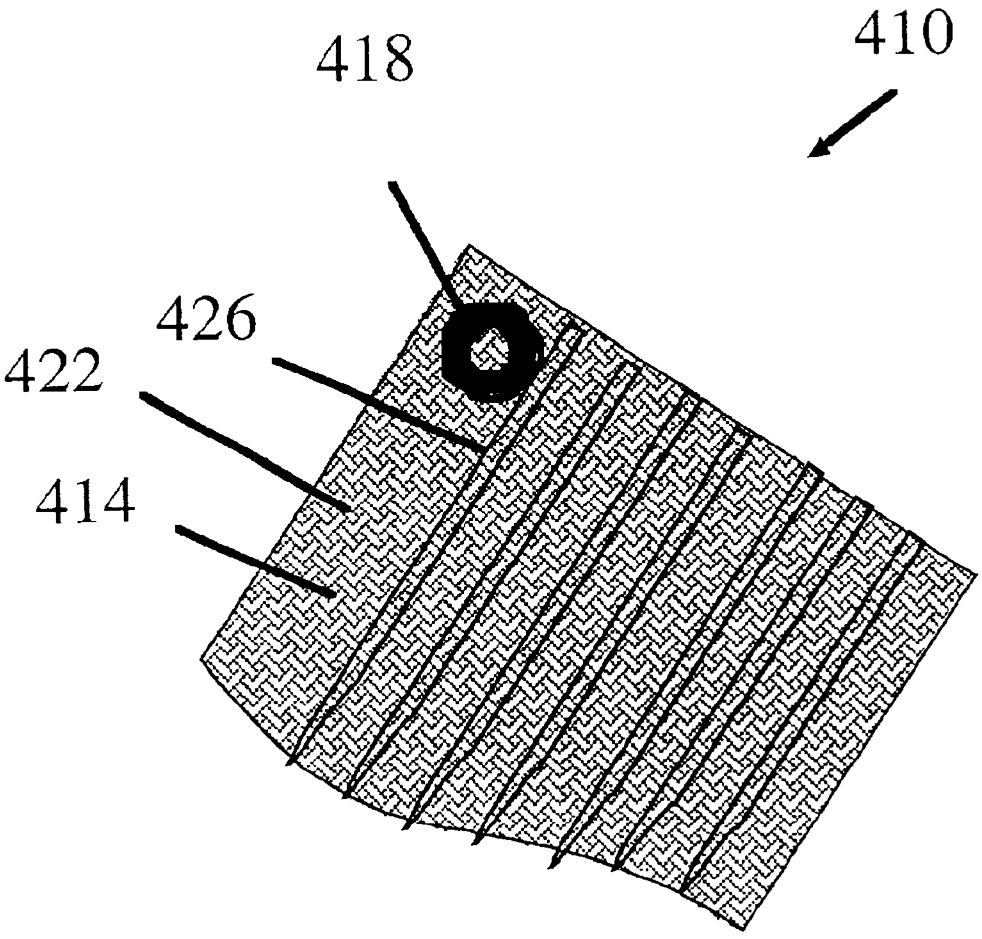
Figure 7D:
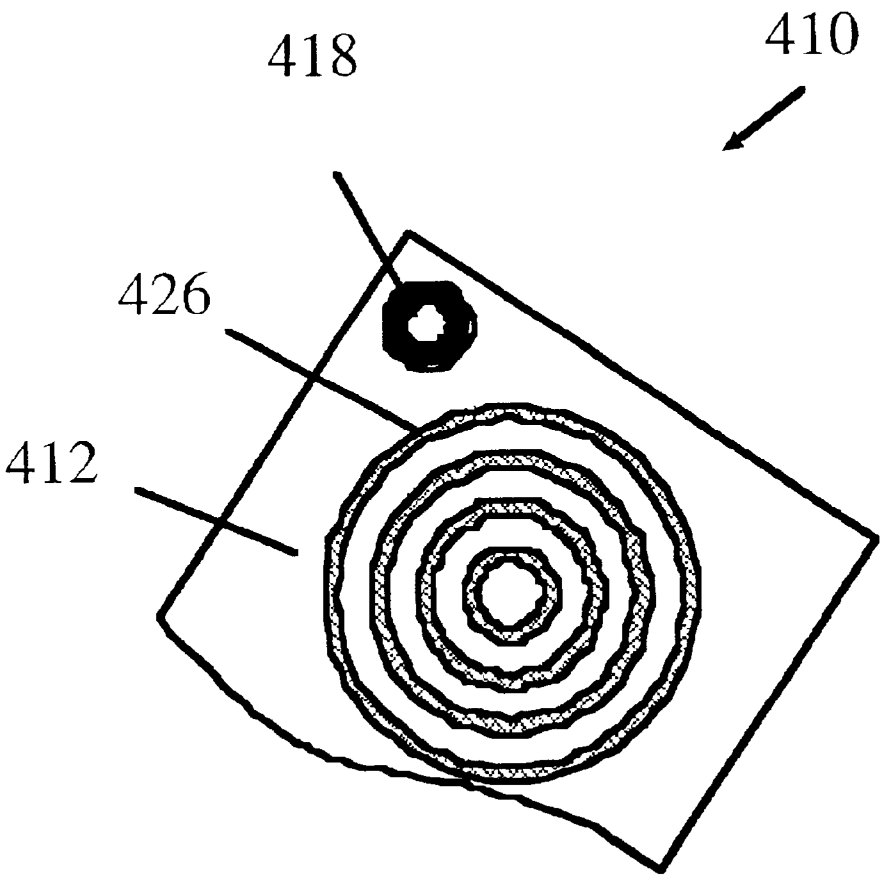
Figure 7E:
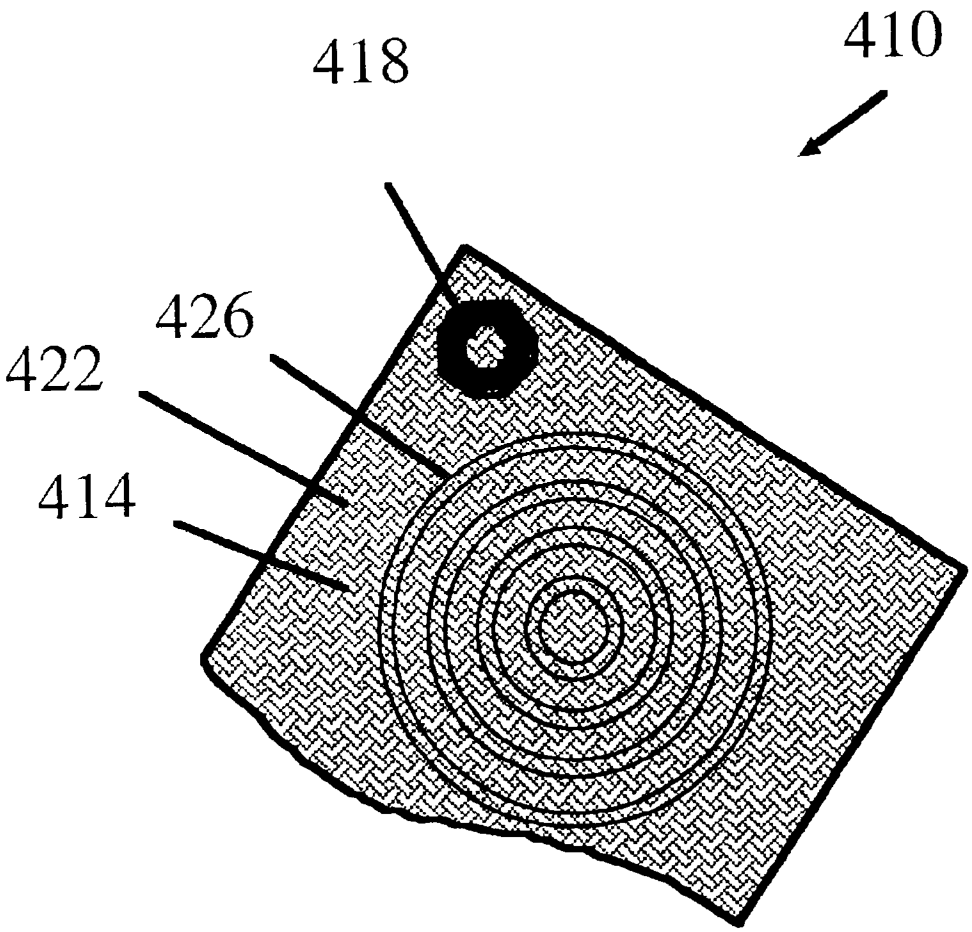

In all alternative embodiments utilizing ionizing cords 426, an ionizing cord 426 is stitched or otherwise attached along a conventional wiping surface 412 (FIGS. 7*a*, 7*b*, and 7*d*) or a ionizing wiping surface 414 (FIGS. 7*c*, 7*e*) with ionizing points 422. Wiper 410 may be grounded or connected to a source of electrical power via connector 418, as described above. The ionizing cord 426 can be stitched or otherwise attached to the wiper 410 in a variety of patterns providing the density of ionizing points are sufficient to ionize the charged particulars on the surface of the substantially insulative object, including the outer surface 424, the central portion 428, and the edges 430, as illustrated in FIG. 7*a*.

MODE OF OPERATION

Below are two examples of typical modes of operation of the present invention. These examples are presented for illustrative purposes and are not intended to limit the invention.

Before painting a plastic car part it is wiped with clean tack wipers to remove dust particles. The operator utilizes the ionizing wiper during final inspection to remove any remaining dust particles and to remove the residual static charge caused by the wiping itself. The conventional soft fibers of the ionizing wiper collect the remaining particles and the residual charge ionizes to the conductive microfiber points on the ionizing portion. The ionized charge is carried across the conductive microfiber network to the grounding connection and to ground via a ground wire or cord.

An operator is examining the surface of a photographic negative before exposing it to light in order to form an enlarged image onto photo paper. She wipes the surface of the negative first with the conventional, soft fiber surface of the Ionizing wiper to remove any dust and dirt and then allows the negative to pass near the ionizing surface portion to remove the residual static charge. The surface static charge ionizes to the conductive microfiber points of the ionizing portion and the ionized charge is carried across the conductive network to her body that acts as ground. The negative is free of dust and dirt and has lower residual static charge. Thus it does not re-attract dust or lint particles as it is being exposed onto the photo paper.

The invention described herein presents to the art a novel, improved wiper which includes a surface or portion exhibiting ionizing microfiber points for efficient static removal from wiped surfaces. The surface or portion is conveniently included as part of a conventional wiper, so that no exchange of wipers is required to effect static charge removal. Fabrication of the wiper is sufficiently low-cost to provide a wiper that is disposable when it becomes dirty or contaminated.

While there has been shown and described what are at present considered the preferred embodiments of the invention, it will be apparent to those skilled in the art that modifications and changes can be made therein without departing from the scope of the present invention.

What is claimed is:

1. An ionizing wiper for removing static charge from an electrically insulative surface, said wiper comprising:

a 2-sided cloth wiper being made of soft fibers exposed on each side of said 2-sided cloth wiper, said each side of said 2-sided cloth wiper having a periphery, an edge along said periphery, and a center portion;

a plurality of ionizing points, said plurality of ionizing points being disposed on one side of said each side of said 2-sided cloth wiper, said plurality of ionizing points being of sufficient density such that air between said plurality of ionizing points and the electrically insulative surface is sufficiently ionized to remove static charge from the insulative surface; and another side of said each side of said 2-sided cloth wiper being substantially devoid of said plurality of ionizing points.

2. The ionizing wiper as recited in claim 1, wherein said plurality of ionizing points are disposed substantially on said edge.

3. The ionizing wiper as recited in claim 2, wherein said plurality of ionizing points are substantially interwoven into said edge.

4. The ionizing wiper as recited in claim 2, wherein said plurality of ionizing points are adhered substantially to said edge.

5. The ionizing wiper as recited in claim 1, wherein said plurality of ionizing points are disposed substantially on said periphery.

6. The ionizing wiper as recited in claim 5, wherein said plurality of ionizing points are interwoven substantially into said periphery.

7. The ionizing wiper as recited in claim 5, wherein said plurality of ionizing points are adhered substantially to said periphery.

8. The ionizing wiper as recited in claim 1, wherein said plurality of ionizing points are disposed substantially on said center portion.

9. The ionizing wiper as recited in claim 8, wherein said plurality of ionizing points are interwoven substantially into said center portion.

10. The ionizing wiper as recited in claim 8, wherein said plurality of ionizing points are adhered substantially into said center portion.

11. The ionizing wiper as recited in claim 1, further comprises at least one ionizing cord, wherein said plurality of ionizing points are disposed on said at least one ionizing cord, said at least one ionizing cord being fabricated with a plurality of microfibers including said plurality of ionizing points, said at least one ionizing cord being stitched substantially into said one side of said each side of said 2-sided cloth wiper.

12. The ionizing wiper as recited in claim 11, wherein said ionizing cord is stitched substantially into said edge.

13. The ionizing wiper as recited in claim 11, wherein said ionizing cord is stitched in a predetermined pattern into substantially said center portion.

14. The ionizing wiper as recited in claim 11, wherein said ionizing cord is stitched substantially into said periphery.

15. The ionizing wiper as recited in claim 1 further comprises grounding means for transferring ionized particles to ground.

16. The ionizing wiper as recited in claim 15, wherein said grounding means comprises a grounding connector fixedly attached to said 2-sided cloth wiper.

17. The ionizing wiper as recited in claim 16, wherein said grounding means further comprises a grounding coil wire removeably attached to said grounding connector.

18. The ionizing wiper as recited in claim 16, wherein said 2-sided cloth wiper further comprises electrical charging means for neutralizing static charge at the electrically insulative surface, said electrical charging means is removeably attached to said grounding connector.

19. An ionizing wiper comprising:

a plurality of soft fibers, said soft fibers joined together to form a 2-sided cloth wiper suitable for hand-wiping dust from an electrically insulative surface, said 2-sided cloth wiper having an anti-static charge surface and a wiping surface;

a plurality of electrically conductive microfibers having a plurality of ionizing points, said wiping surface being substantially devoid of said plurality of ionizing points, said plurality of electrically conductive microfibers operably connected to said anti-static charge surface, whereby air between said ionizing points adjacent to the electrically insulative surface is sufficiently ionized to remove static charge from the electrically insulative surface; and a connector, said connector being electrically connected to said plurality of electrically conductive microfibers, whereby static charge is transferred from said electrically conductive microfibers to ground via said connector.

* * * * *